United States Patent
Rodriguez Herrera et al.

(10) Patent No.: US 11,261,729 B2
(45) Date of Patent: Mar. 1, 2022

(54) METHODS AND SYSTEMS FOR DETERMINING INTEGRITY AND OPERATIONAL BOUNDARIES OF SUBTERRANEAN WELLS

(71) Applicant: Schlumberger Technology Corporation, Sugar Land, TX (US)

(72) Inventors: Adrian Rodriguez Herrera, West Sussex (GB); Ram Sunder Kalyanraman, Houston, TX (US); Karsten Fischer, Abingdon (GB); James Minton, Abingdon (GB); Francisco Jose Gomez, Oxford (GB); Assef Mohamad Hussein, West Sussex (GB); Saad Kisra, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/429,221

(22) Filed: Jun. 3, 2019

(65) Prior Publication Data
US 2020/0378246 A1 Dec. 3, 2020

(51) Int. Cl.
*G01V 1/50* (2006.01)
*E21B 47/14* (2006.01)

(52) U.S. Cl.
CPC .............. *E21B 47/14* (2013.01); *G01V 1/50* (2013.01); *G01V 2210/6161* (2013.01); *G01V 2210/74* (2013.01)

(58) Field of Classification Search
None
See application file for complete search history.

(56) References Cited

U.S. PATENT DOCUMENTS

| | | | |
|---|---|---|---|
| 2003/0024323 A1 | 2/2003 | Wang et al. | |
| 2015/0127308 A1 | 5/2015 | Thomas, Jr. et al. | |
| 2018/0188415 A1* | 7/2018 | Imhof | G06F 30/20 |
| 2018/0293789 A1* | 10/2018 | Shen | E21B 47/00 |
| 2020/0302625 A1* | 9/2020 | Helmore | G01B 11/24 |
| 2020/0394839 A1* | 12/2020 | Helmore | G06T 15/04 |

FOREIGN PATENT DOCUMENTS

JP 2007187593 A 7/2007

OTHER PUBLICATIONS

Szary, "The Finite Element Method Analysis for Assessing the Remaining Strength of Corroded Oil Field Casing and Tubing," PhD thesis, Feb. 2006. Freiberg University. (Year: 2006).*
American Society of Mechanical Engineers, "B31G-2012: Manual for Determining the Remaining Strength of Corroded Pipelines," ASME, 2012.

(Continued)

*Primary Examiner* — Srilakshmi K Kumar
*Assistant Examiner* — Jerold B Murphy

(57) ABSTRACT

Methods and systems for determining a property of a tubular are described. Measurement data of cross-sectional shapes of the tubular at a plurality of depth positions is provided. A three-dimensional mesh representing the tubular based on the cross-sectional shapes is generated. A stress simulation using the three-dimensional mesh to provide an integrity assessment of the tubular is performed.

20 Claims, 10 Drawing Sheets

(56) References Cited

OTHER PUBLICATIONS

Arthur, "Application of Well Integrity Methods for Gas Storage Wells," Presented at the 23rd IPEC Conference, New Orleans, Louisiana, Nov. 8-10, 2016.
Freifeld, et al., "Well Integrity for Natural Gas Storage in Depleted Reservoirs and Aquifers," DOE National laboratories Well Integrity Work Group, Sep. 2016.
Lee, et al., "Reliability of Buried Pipeline Using a Theory of Probability of Failure," Solid State Phenomena, vol. 110, 2006, pp. 221-230.
Syed, "Wellbore Integrity of Gas Storage Wells—Current Perspectives," UIC Conference—Groundwater Protection Council, Austin, TX, Feb. 21-23, 2017.
Szary, "The Finite Element Method Analysis for Assessing the Remaining Strength of Corroded Oil Field Casing and Tubing," PhD thesis, Feb. 2006. Freiberg University.
"CO2Wells: guideline for the risk management of existing wells at CO2 geological storage sites," DNV Report No. 2011-0448—Jun. 2011.
Silva et al., "Automatic finite element solid modeling, burst and error analyses of corroded pipelines," International Journal of Mechanics, 2008, vol. 2, Iss. 3, pp. 77-86.
International Search Report and Written Opinion dated Sep. 15, 2020 in corresponding International Application No. PCT/US2020/035651, 9 pages.

* cited by examiner 502   504   506   508

METHODS AND SYSTEMS FOR DETERMINING INTEGRITY AND OPERATIONAL BOUNDARIES OF SUBTERRANEAN WELLS

BACKGROUND

The economic recovery of natural resources such as oil is extremely difficult. Over time, the tubular liner of a completed well may become degraded. There are many sources of degradation such as corrosion and deformation. The tubular may also develop cracks or discontinuities. A degraded tubular may have a compromised burst pressure and reduced remaining strength.

The determination of remaining strength in tubulars is currently completed using analytical approaches to calculate the reduced burst pressure or by using multi-purpose numerical simulation packages for mechanical applications. The setup and interpretation of such generic stress simulations is generally very time-consuming and requires extensive expertise in numerical simulation to be carried out. Further, the analytical approach to calculate reduced burst pressure does not consider the detailed geometry of the wear and tear of the tubular since it does not operate on the type of wireline measurements able to provide this information.

Accordingly, methods and systems for determining integrity and operational boundaries of subterranean wells are desirable.

SUMMARY

In an embodiment, a method determines a property of a tubular. Measurement data of cross-sectional shapes of the tubular at a plurality of depth positions is provided. A three-dimensional mesh representing the tubular based on the cross-sectional shapes is generated. A stress simulation using the three-dimensional mesh to provide an integrity assessment of the tubular is performed.

The integrity assessment may be displayed.

Performing the stress simulation may include simulating stress results for a constant applied pressure, and displaying may include displaying a representation of stress in the tubular associated with the constant applied pressure.

Performing the stress simulation may include simulating the stress results for the constant applied pressure applied internally to provide an integrity assessment of burst conditions.

Performing the stress simulation may include simulating the stress results for the constant applied pressure applied externally to provide an integrity assessment of collapse conditions.

Performing the stress simulation may include simulating the stress results for the constant applied pressure applied axially to provide an integrity assessment of buckling conditions.

Performing the stress simulation may include simulating the stress results for a variable applied pressure applied internally to provide an integrity assessment of burst conditions. A result of the stress simulation may include stress results associated with a range of the variable applied pressures such that a user may adjust the displayed integrity assessment without recalculating the stress simulation.

Performing the stress simulation may include simulating the stress results for a variable applied pressure applied externally to provide an integrity assessment of collapse conditions. A result of the stress simulation may include stress results associated with a range of the variable applied pressures such that a user may adjust the displayed integrity assessment without recalculating the stress simulation.

Performing the stress simulation may include simulating the stress results for a variable applied pressure applied axially to provide an integrity assessment of buckling conditions. A result of the stress simulation may include stress results associated with a range of the variable applied pressures such that a user may adjust the displayed integrity assessment without recalculating the stress simulation.

The measurement data may include ultrasonic data.

The measurement data may include at least one of inner radius information, outer radius information, nominal casing thickness information, and wall thickness information. The wall thickness information may be measured wall thickness information.

The stress simulation may be based at least in part on mechanical properties of environment around the tubular. The mechanical properties are based at least in part on an ultrasonic dataset.

In another embodiment, a non-transitory computer readable medium includes instructions for causing a processor to perform any method described herein.

In another embodiment, a system includes a memory and a processor. The memory is configured to store measurement data including cross-sectional shapes of a tubular at a plurality of depth positions. The processor is configured to generate a three-dimensional mesh representing the tubular based on the cross-sectional shapes, and perform a stress simulation using the three-dimensional mesh to provide an integrity assessment of the tubular.

The system may include a display configured to display the integrity assessment.

The processor may be configured to simulate stress results for a constant applied pressure and cause the display to display a representation of stress in the tubular associated with the constant applied pressure. The constant applied pressures may include at least one of an internal pressure to provide an integrity assessment of burst conditions, an external pressure to provide an integrity assessment of collapse conditions, and an axial pressure to provide an integrity assessment of buckling conditions.

The system may include a user input device configured to receive an adjustment of a pressure value. The processor may be configured to cause the displayed integrity assessment in response to the adjustment of the pressure value without re-performing the stress simulation.

The measurement data includes ultrasound data and at least one of inner radius information, outer radius information, and wall thickness information.

The stress simulation is based at least in part on mechanical properties of environment around the tubular.

BRIEF DESCRIPTION OF THE DRAWINGS

For a better understanding of the aforementioned embodiments as well as additional embodiments thereof, reference should be made to the Detailed Description below, in conjunction with the following drawings in which like reference numerals refer to corresponding parts throughout the figures.

DETAILED DESCRIPTION

Figure 1A:
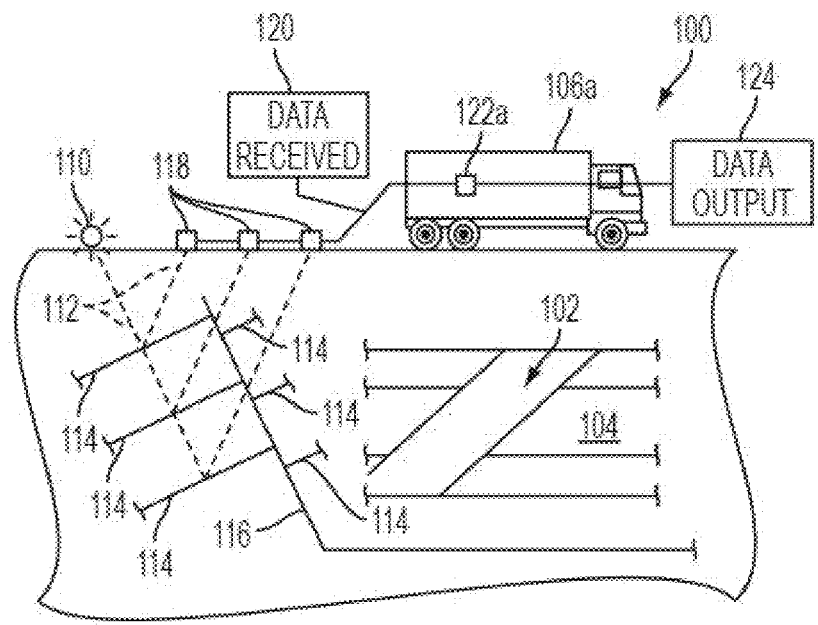
FIG. 1A illustrates a simplified schematic view of a survey operation performed by a survey tool at an oil field.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the invention herein is for the purpose of describing particular embodiments and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

The computing systems, methods, processing procedures, techniques and workflows disclosed herein are more efficient and/or effective methods for identifying, isolating, transforming, and/or processing various aspects of data that is collected from a subsurface region or other multi-dimensional space to enhance flow simulation prediction accuracy. The described methods and apparatus provide a new technological solution to the petroleum engineering problems described herein. Embodiments are directed to new and specialized processing apparatus and methods of using the same. Integrity determination according to the present application implicates a new processing approach (e.g., hardware, special purpose processors, specially programmed general-purpose processors) because such analyses are too complex and cannot be done by a person in the time available or at all. Thus, the apparatus and method of the claims are directed to tangible implementations or solutions to a specific technological problem in the seismic field.

Figure 1B:
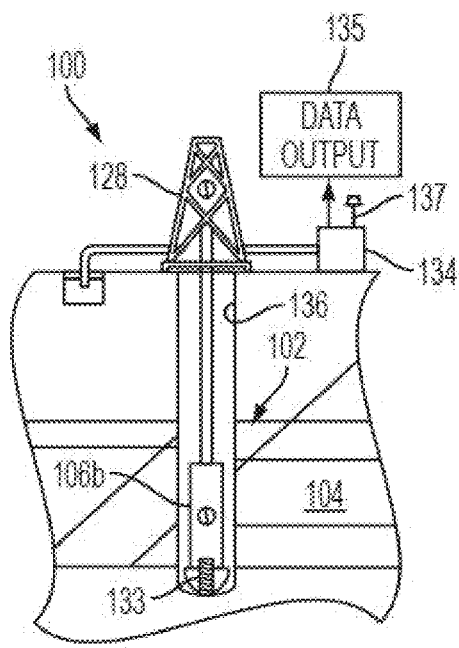
FIG. 1B illustrates a simplified schematic view of a drilling operation performed by drilling tools.
Figure 1C:
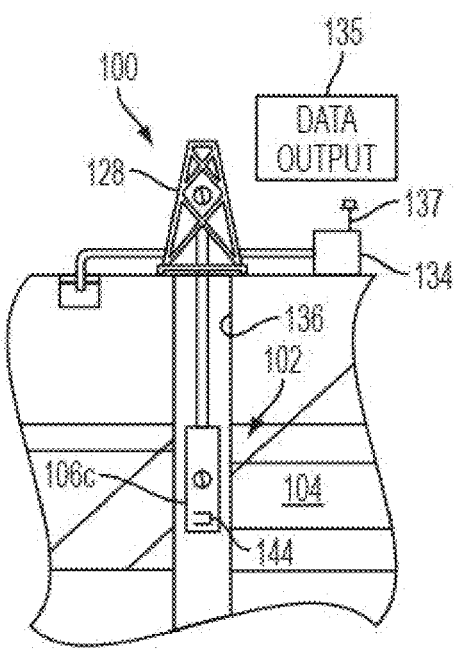
FIG. 1C illustrates a simplified schematic view of a production operation performed by a production tool.

FIGS. 1A-1C illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of the seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. The drilling tools are advanced into subterranean formations 102 to reach reservoir 104. Each well may target one or more reservoirs. The drilling tools may be adapted for measuring downhole properties using logging while drilling tools. The logging while drilling tools may also be adapted for taking core sample 133 as shown.

The drilling tool 106b may include downhole sensor S adapted to perform logging while drilling (LWD) data collection. The sensor S may be any type of sensor.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit).

The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

The data gathered by sensors (S) may be collected by surface unit 134 and/or other data collection sources for analysis or other processing. An example of the further processing is the generation of a grid for use in the computation of a juxtaposition diagram as discussed below. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller.

FIG. 1C illustrates a production operation being performed by production tool 106*c* deployed from a production unit or Christmas tree and into completed wellbore 136 for drawing fluid from the downhole reservoirs into surface facilities. The fluid flows from reservoir 104 through perforations in the casing (not shown) and into production tool 106*c* in wellbore 136 and to surface facilities.

Sensors (S), such as gauges, may be positioned about oilfield 100 to collect data relating to various field operations as described previously. As shown, the sensor (S) may be positioned in production tool 106*c* or associated equipment, such as Christmas tree, gathering network, surface facility, and/or the production facility.

While FIGS. 1B-1C illustrate tools used to measure properties of an oilfield, it will be appreciated that various measurement tools capable of sensing parameters, such as seismic two-way travel time, density, resistivity, production rate, etc., of the subterranean formation and/or its geological formations may be used. As an example, wireline tools may be used to obtain measurement information related to casing attributes. The wireline tool may include a sonic or ultrasonic transducer to provide measurements on casing geometry. The casing geometry information may also be provided by finger caliper sensors that may be included on the wireline tool. Various sensors (S) may be located at various positions along the wellbore and/or the monitoring tools to collect and/or monitor the desired data. Other sources of data may also be provided from offsite locations.

Figure 2:
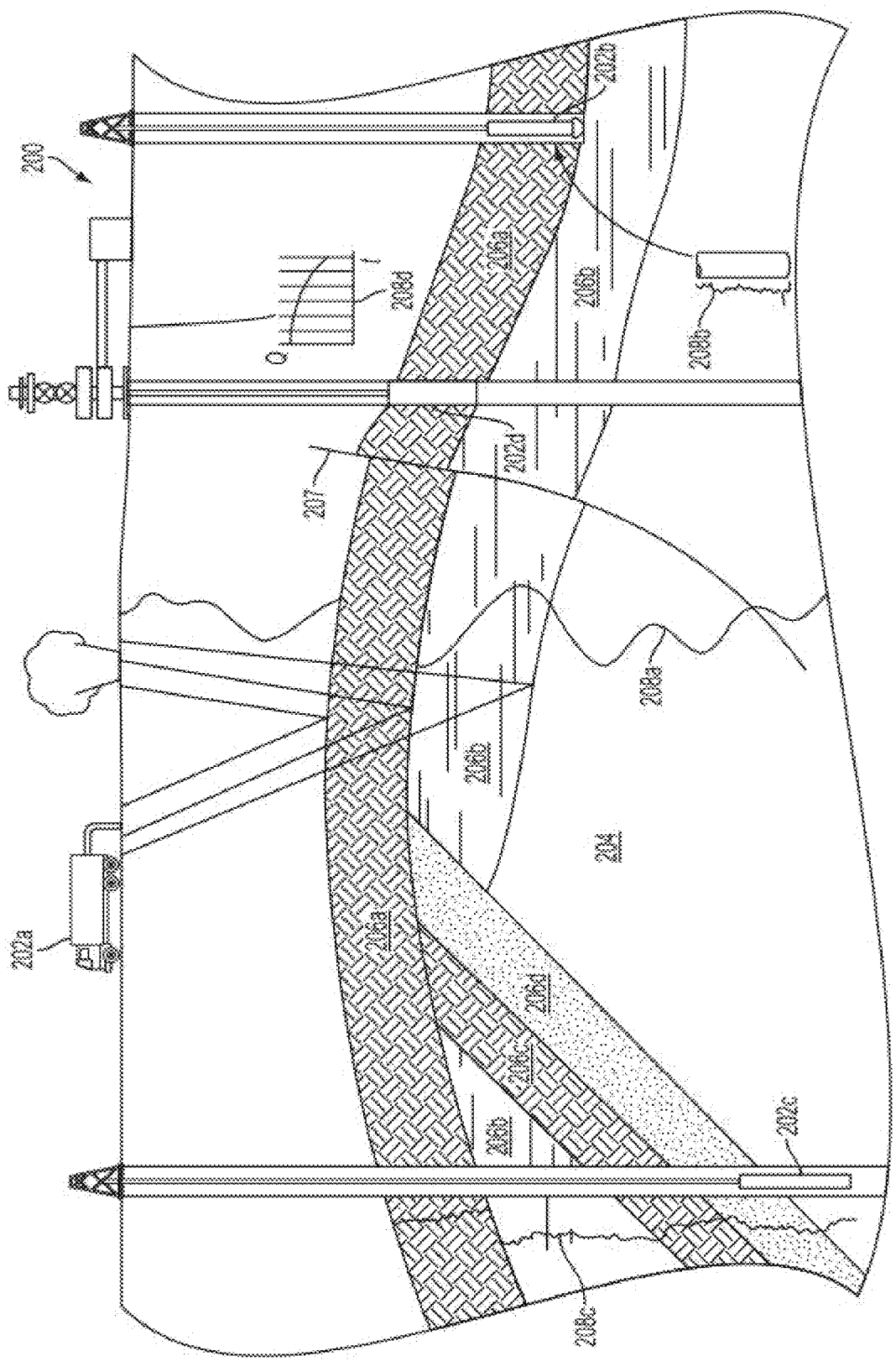
FIG. 2 illustrates a schematic view, partially in cross section, of an oilfield.

The field configurations of FIGS. 1A-1C are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites. An example of processing of data collected by the sensors is the generation of a grid for use in the computation of a juxtaposition diagram as discussed below FIG. 2 illustrates a schematic view, partially in cross section of oilfield 200 having data acquisition tools 202*a*, 202*b*, 202*c* and 202*d* positioned at various locations along oilfield 200 for collecting data of subterranean formation 204 in accordance with implementations of various technologies and techniques described herein. Data acquisition tools 202*a*-202*d* may be the same as data acquisition tools 106*a*-106*c* of FIGS. 1A-1C, respectively, or others not depicted. As shown, data acquisition tools 202*a*-202*d* generate data plots or measurements 208*a*-208*d*, respectively. These data plots are depicted along oilfield 200 to demonstrate the data generated by the various operations.

Data plots 208*a*-208*c* are examples of static data plots that may be generated by data acquisition tools 202*a*-202*c*, respectively; however, it should be understood that data plots 208*a*-208*c* may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208*a* is a seismic two-way response over a period of time. Static plot 208*b* is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208*c* is a logging trace that provides a resistivity or other measurement of the formation at various depths.

A production decline curve or graph 208*d* is a dynamic data plot of the fluid flow rate over time. The production decline curve provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206*a*-206*d*. As shown, this structure has several formations or layers, including a shale layer 206*a*, a carbonate layer 206*b*, a shale layer 206*c* and a sand layer 206*d*. A fault 207 extends through the shale layer 206*a* and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, for example below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated.

Figure 3:
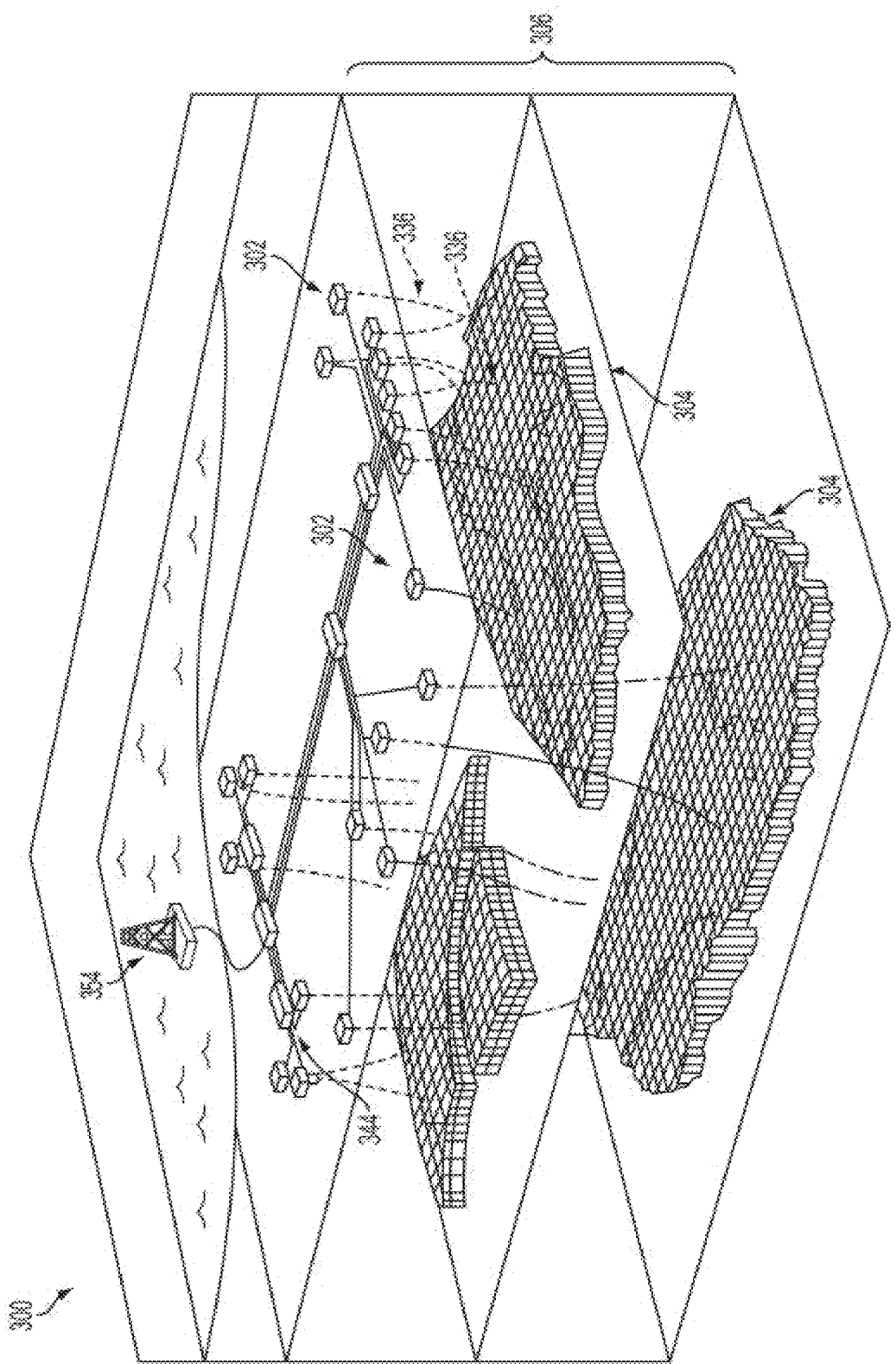
FIG. 3 illustrates a perspective view of an oilfield.

FIG. 3 illustrates an oilfield 300 at which production operations in accordance with implementations of various technologies and techniques described herein may be performed. The oilfield 300 has a plurality of wellsites 302 operatively connected to central processing facility 354. The oilfield configuration of FIG. 3 does not limit the scope of the oilfield application system. The oilfield, or parts thereof, may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores 336 extend through subterranean formations 306 including reservoirs 304. These reservoirs 304 contain fluids, such as hydrocarbons. The wellsites 302 draw fluid from the reservoirs 304 and pass them to the processing facility 354 via surface networks 344.

Attention is now directed to methods, techniques, and workflows for processing and/or transforming collected data that are in accordance with some embodiments. Some operations in the processing procedures, methods, techniques, and workflows disclosed herein may be combined and/or the order of some operations may be changed. Those with skill in the art will recognize that in the geosciences and/or other multi-dimensional data processing disciplines, various interpretations, sets of assumptions, and/or domain models such as drilling plan models, may be refined in an iterative fashion; this concept is applicable to the procedures, methods, techniques, and workflows as discussed herein. This iterative refinement can include use of feedback loops executed on an algorithmic basis, such as at a computing device (e.g., computing system 1100, FIG. 8), and/or through manual control by a user who may make determinations regarding whether a given action, template, or model has become sufficiently accurate. In an embodiment, a graphics processing unit is used to carry the below described process. Graphics processing units are specialized hardware that are designed to carry out calculations on information represented as polygons. Thus, the graphics processing unit is well-suited to provide an efficient and high speed geophysics processor.

Data from inspected tubulars may be used in an approach for assessing the integrity of the tubular in a completed well. For example, ultrasound or other measurements taken by the wireline tool discussed above provides information about the state and thickness of the tubular. The data may show that the tubular has become thin, or the data return from the sensor may indicate that the tubular has corroded. From this data, cross-sectional profiles of the tubular at different depth positions may be created. The cross-sectional profiles may include cross-sectional images that describe the pipe contour and wall thickness.

Mechanical properties of the tubular and the surrounding environment may be used to generate a mesh. The properties of the surrounding environment may be provided by, for example, seismic data of the environment, logging while drilling data, and wireline measurements. A numerical stress simulation may be performed on the mesh. The simulation results may be used to analyze the behavior of the tubular under different stress conditions to predict operational boundaries.

Although destructive techniques such as taking a core sample may be used to obtain the wall thickness and tubular material measurements, this may compromise the integrity of the well or require patching afterward. Thus, non-destructive measurement techniques such as sonography, and finger caliper logs may be used.

In some embodiments, well logged data and numerical stress simulations may be used for determining critical operating pressures of production or injection wells. Pipe shape is measured, using for example, non-destructive techniques, to provide tubular data. The tubular data may include inner radius, outer radius and wall thickness. A three-dimensional stress simulation model may be automatically generated that describes the geometry and material properties of the object under test. The model may also be extended to incorporate the geometry and properties of the surrounding environment. A set of reference conditions may be defined and the model may be loaded to a processor to simulate the stress distribution along the length of the pipe. Simulation results may be post-processed and presented to a user to determine critical pressures attributed to pipe burst or collapse.

Stress images may also be created and displayed to analyze stress simulation results along the length of pipes. The stress images may include representations of the magnitude of the burst and collapse pressures. Two types of stress images are static load images and dynamic load images.

A static load image may depict simulated stress results for an applied pressure that may be based on boundary conditions along the length of the pipe. The applied pressure may be internal for burst conditions, external for collapse conditions, or axial for buckling conditions. The value of the applied pressure may be user defined or computed from the results, e.g. the maximum allowable pressures along the simulated pipe section. The applied pressure may be constant, or dynamically applied, for example by ramping up the pressure during the numerical simulation.

A dynamic load image may depict simulated stress results for a variable applied pressure that may be based on boundary conditions along the length of the pipe. The variable applied pressure may be internal for burst conditions, external for collapse conditions, or axial for buckling conditions. The values of the applied pressure may be user defined or computed from the results, e.g. the maximum allowable pressures along the length of the pipe.

Figure 4:
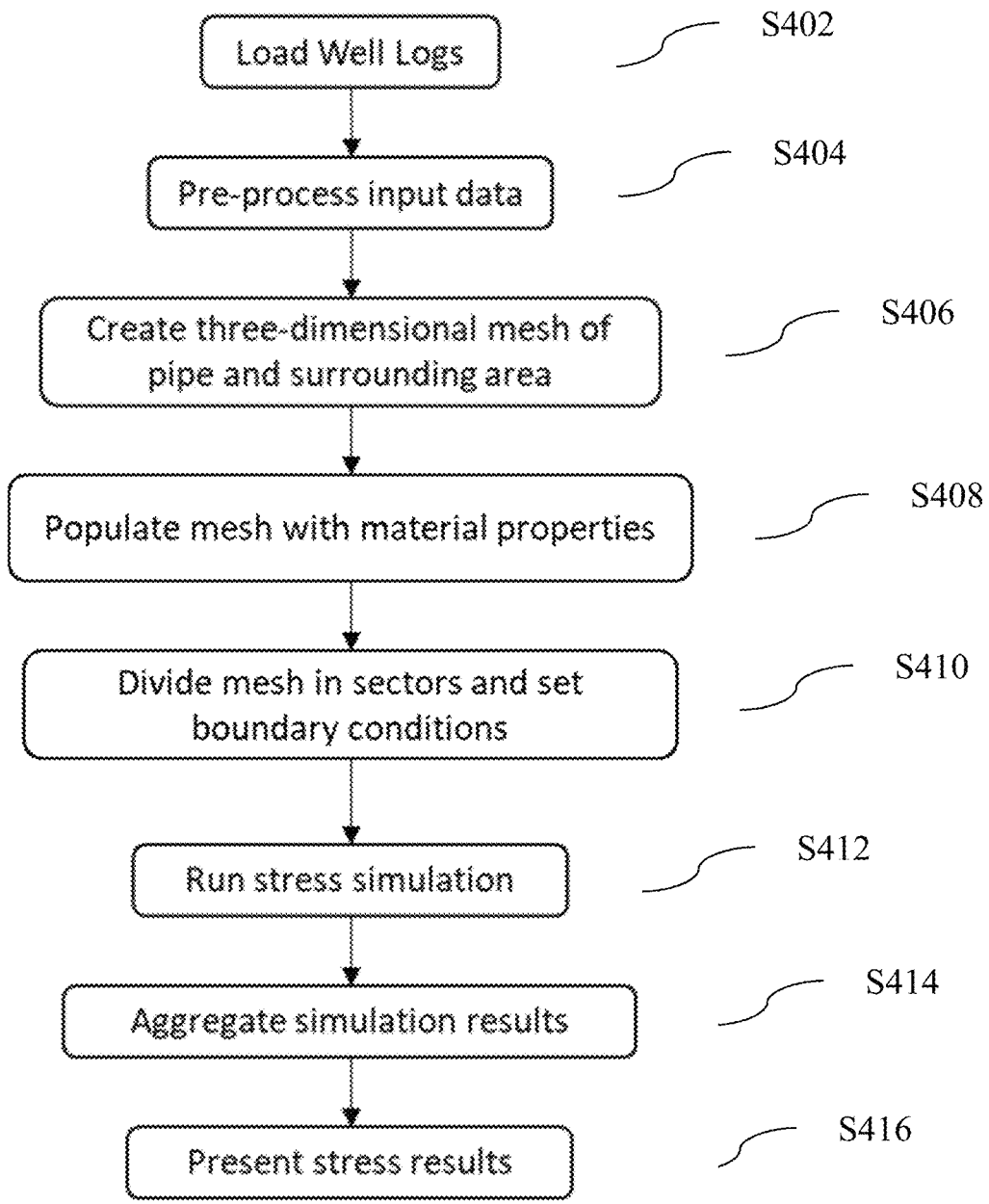
FIG. 4 illustrates a flow chart of an integrity assessment.

Referring to FIG. 4, a workflow for assessing the integrity and operational boundaries of production and injection wells will be discussed. The workflow may use ultrasonic measurements to generate a finite element mesh of a pipe. The stress simulation may be run for a loading that emulates one or more of burst, collapse and buckling conditions. The stress simulation results may be depicted along the depth of the well and borehole azimuth in a stress image.

At S402, well logs are loaded. The well logs may include data acquired from corrosion, cement evaluation logs or any other logging methods and technologies that can provide geometry information such as inner radius, wall thickness and properties of installed components and formation.

Figure 5:
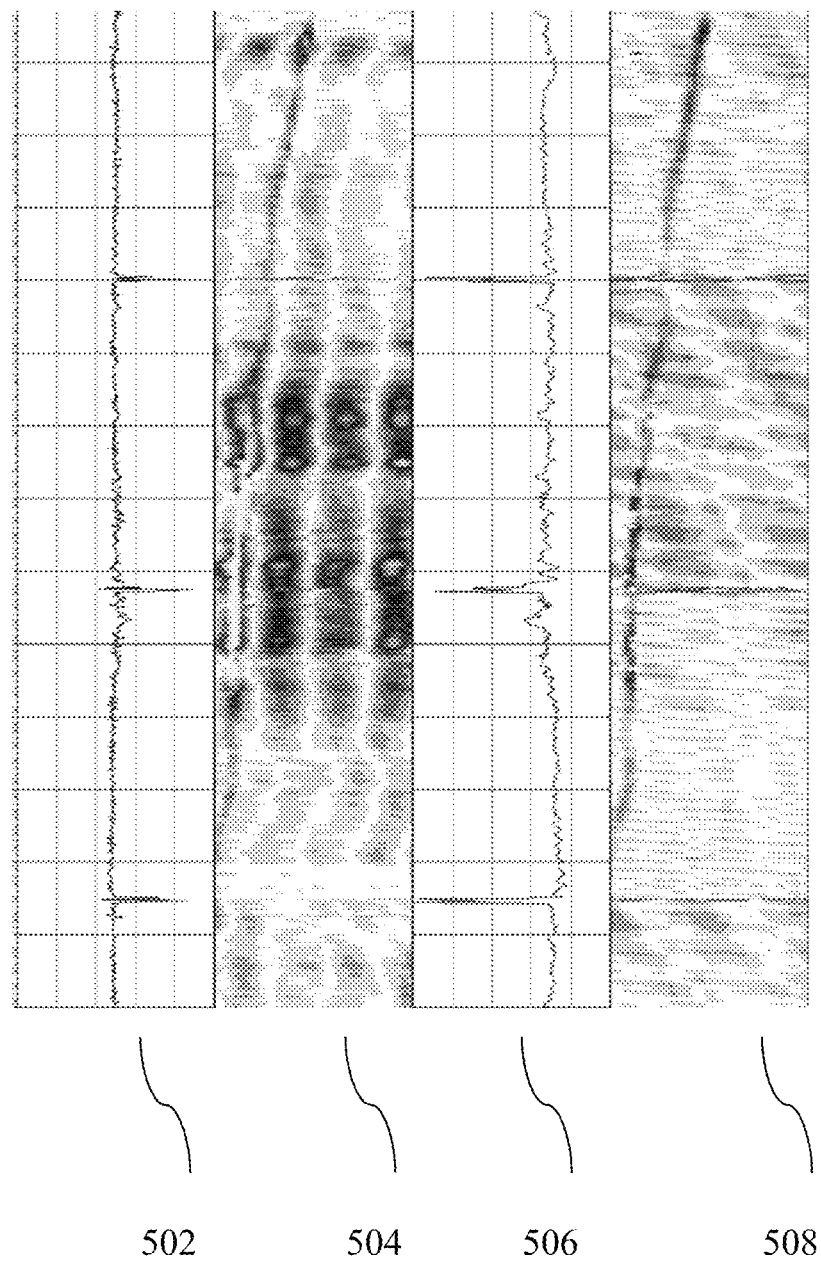
FIG. 5 illustrates a plot of input data.

FIG. 5 illustrates an example of input data that includes ultrasonic data. The height-wise axis is depth of the tubular. Strip plot 502 illustrates average inner radius. The average may be taken based on the inner radius at different radial positions at a given depth. The width-wise axis is magnitude. Strip plot 504 illustrates a delta between the inner radius and the average inner radius. The width-wise axis is radial position. Strip plot 506 illustrates average thickness. The average may be taken based on the inner radius at different radial positions at a given depth. The width-wise axis is magnitude. Strip plot 508 illustrates a delta between the thickness and the average thickness. The width-wise axis is radial position.

As S404, the input well log data is preprocessed. The preprocessing may remove mesh components (e.g., grid points or measurement values) that can affect the creation of the simulation mesh that could introduce undesirable artifacts in the simulation results. The undesirable artifacts may have a number of causes and may represent themselves as unrealistic sharp changes in geometry, or spikes, or missing data if the model has already been sanitized. This can result in a geometry that does not represent the reality of the casing. Unrealistic changes in the geometry can cause errors in the stress distribution. Missing data may result in a blurring out of the detail as an average geometry may be used in the zones with missing data. Averaging or blurring out data is generally preferable to including unrealistic or impossible geometry.

For example, if there are discontinuities in the well log data, those discontinuities may be filled in so that the tubular represented in the well log data is continuous. As another example, if there are abrupt changes in a measurement, such as a significant change in thickness or radius from one depth location to a nearby depth location, those measurements may be smooth, such as by the application of an averaging filter. High or low value outliers may also be removed or limited to a specified range. These pre-processing steps can remove measurements that are erroneous in the well log data that could significantly alter the simulation results. The pre-processing steps may also smooth the data so that discontinuities that could operate like impulse functions in the simulation are removed for better results.

Figure 6:
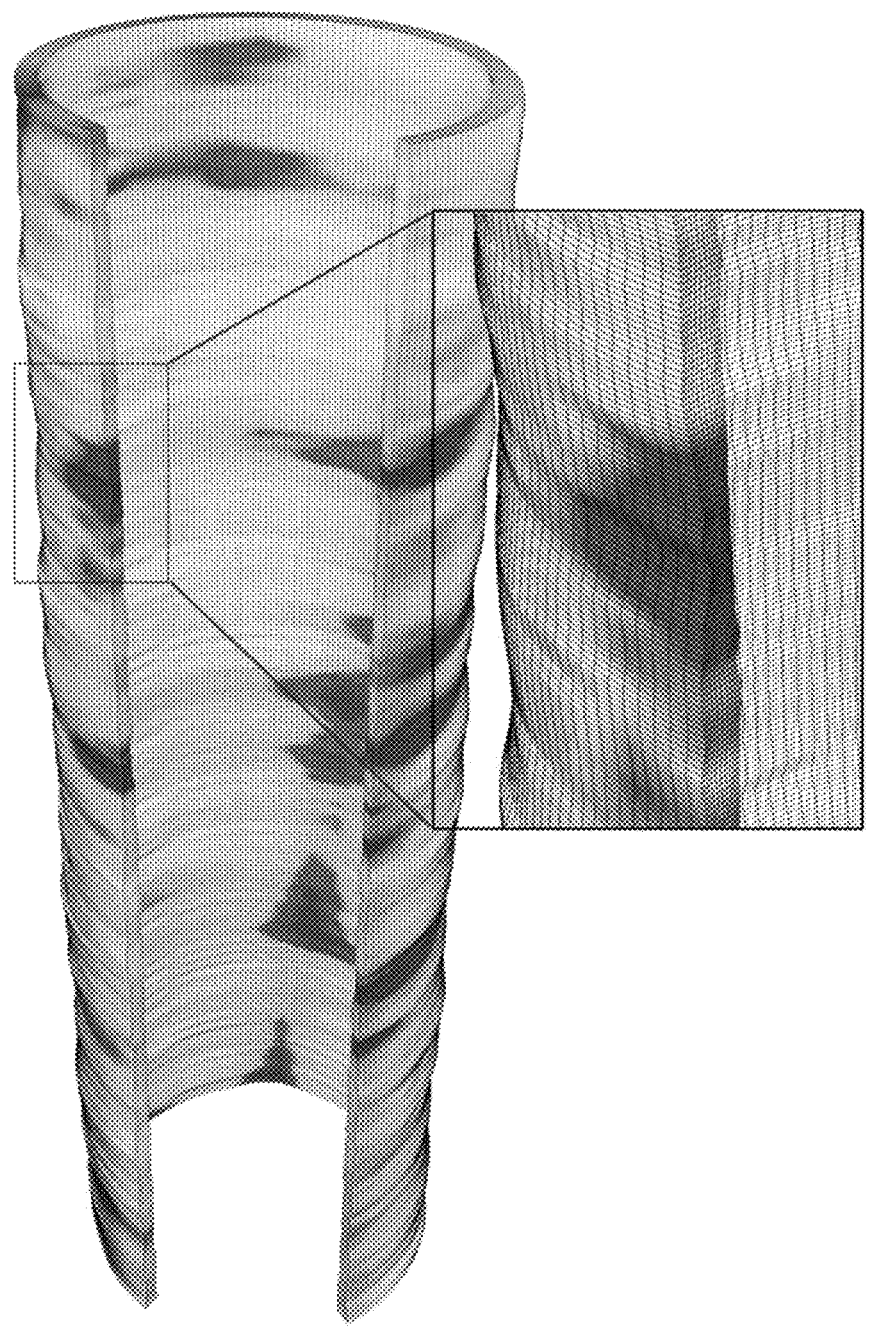
FIG. 6 illustrates a three-dimensional plot of a mesh.

At S406, a finite element mesh is generated for the components under analysis, for example the tubular, based on the pre-processed well data. The spatial resolution of the input data may be used to define the mesh resolution to capture relevant geometrical features. Thresholds on inner radius or thickness measurements may be used to model cavities in the pipes and/or mechanical properties degradations. A three-dimensional finite element mesh is illustrated in FIG. 6. The grid is illustrated in partial cross-section to show the inner radius, outer radius, and wall thickness information included in the mesh.

At S408, the components in the mesh are populated with material properties. Material properties may include a type of steel, strength of the material at a node in the mesh and so forth. Other examples of material properties include elastic properties of the steel that may be determined from the type of steel such as the Young's Modulus or Poisson Ratio. The mesh may also be populated with parameters based on company standards such as a yield tolerance.

At S410, the mesh is divided into sectors for a finite element simulation based on a set of conditions such that the integrity of the tubular under analysis can be assessed and critical operating conditions determined. For example, the sectors may be determined based on depth sections, radial direction, sections of tubular having certain wall thickness or wall radius properties, surrounding environment parameters, and so forth. An additional advantage of dividing the mesh into sectors is that the execution speed of the simulation may be increased because the simulation mesh is divided into smaller pieces that can be run in parallel. A stress simulation may involve multi-million element models. Thus, division of the mesh and the use of multiple processors or an elastic cloud environment may improve the rendering time of results.

At S412, the stress simulation is performed. The stress simulation may be distributed and run concurrently on multiple processors. The stress simulation is performed on the mesh generated as described above that includes the tubular information such as inner or outer radius, wall thickness, tubular material, and tubular corrosion state.

Figure 7:
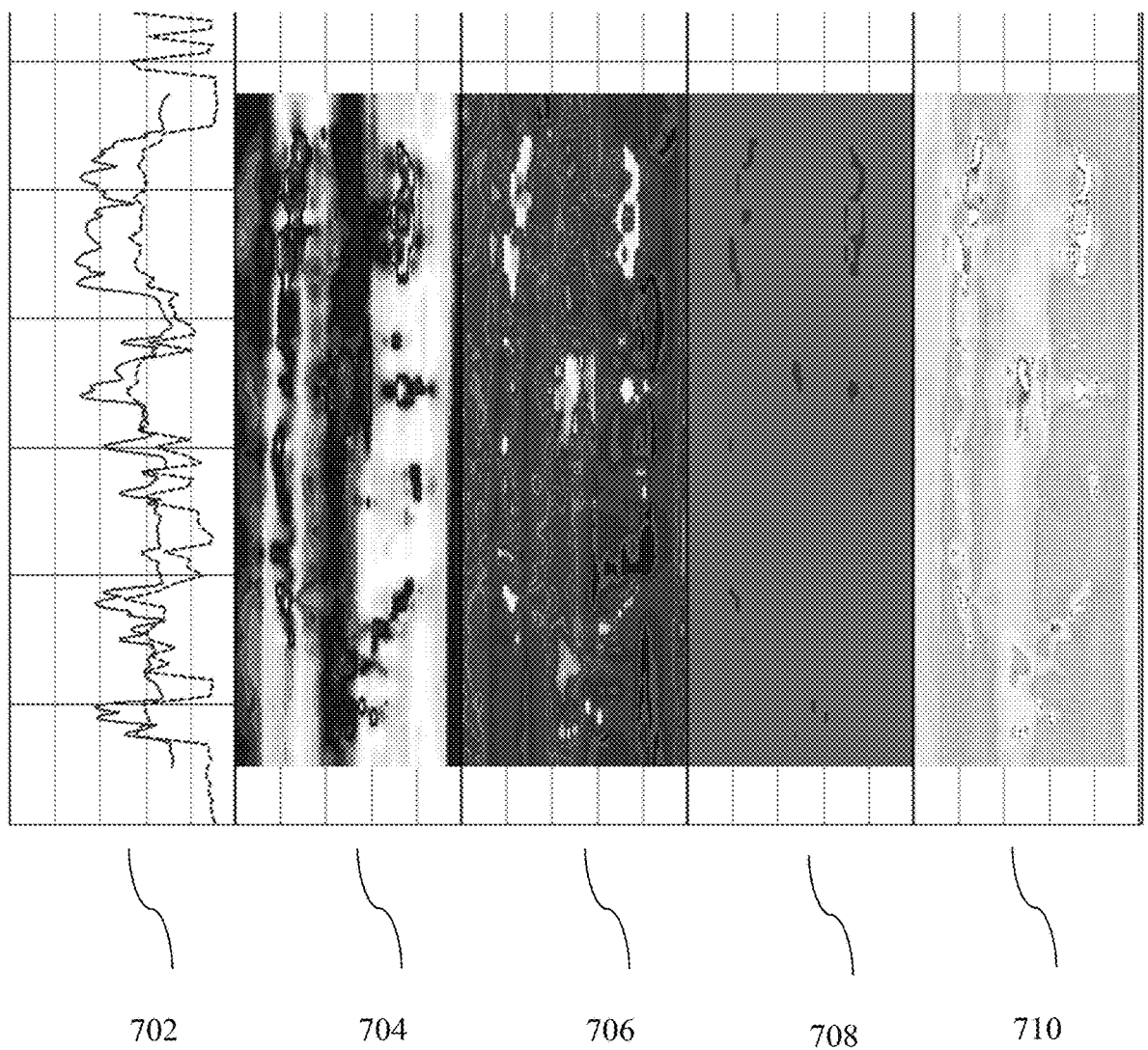
FIG. 7 illustrates a plot of 1D and 2D output data.

At S414, the simulation results may be post-processed to combine results from individual simulations and outputs may be converted to 2D images and logs for analysis. FIG. 7 illustrates 1D and 2D results. Strip 702 illustrates determined burst pressure as a 1D plot. The height-wise axis is depth of the tubular. The width-wise axis is magnitude. Strip plot 704 illustrates determined burst pressure as a 2D plot. The width-wise axis is radial position and the burst pressure is represented by darkness or color. Strip 706 illustrates determined Von Mises stress as a 2D plot. Strip 708 illustrates yield mode as a 2D plot. Yield mode is an indicative value as to how, if at all, a material has yielded. In the illustrated example, yield mode is shown as a binary state indicating whether a section of the model will have yielded in an element at this pressure or not. Yield mode may also have more states. For example, yield mode may distinguish between tensile, compressive or pore collapse modes of failure associated with more complex materials such as soils or rocks. Yield mode may be indicated in the plot by various colors respectively associated with the yield mode state at that location of the mesh. Strip 710 illustrates yield value as a 2D plot. Yield value may represent a measure of how far past the yield surface a stress will take a section of the model. A value of 0 may represent a point where the material is on the point of yield. For example, in a Von Mises failure state such as illustrated in this figure, the yield surface is represented by a single value (e.g., yield strength).

Figure 8:
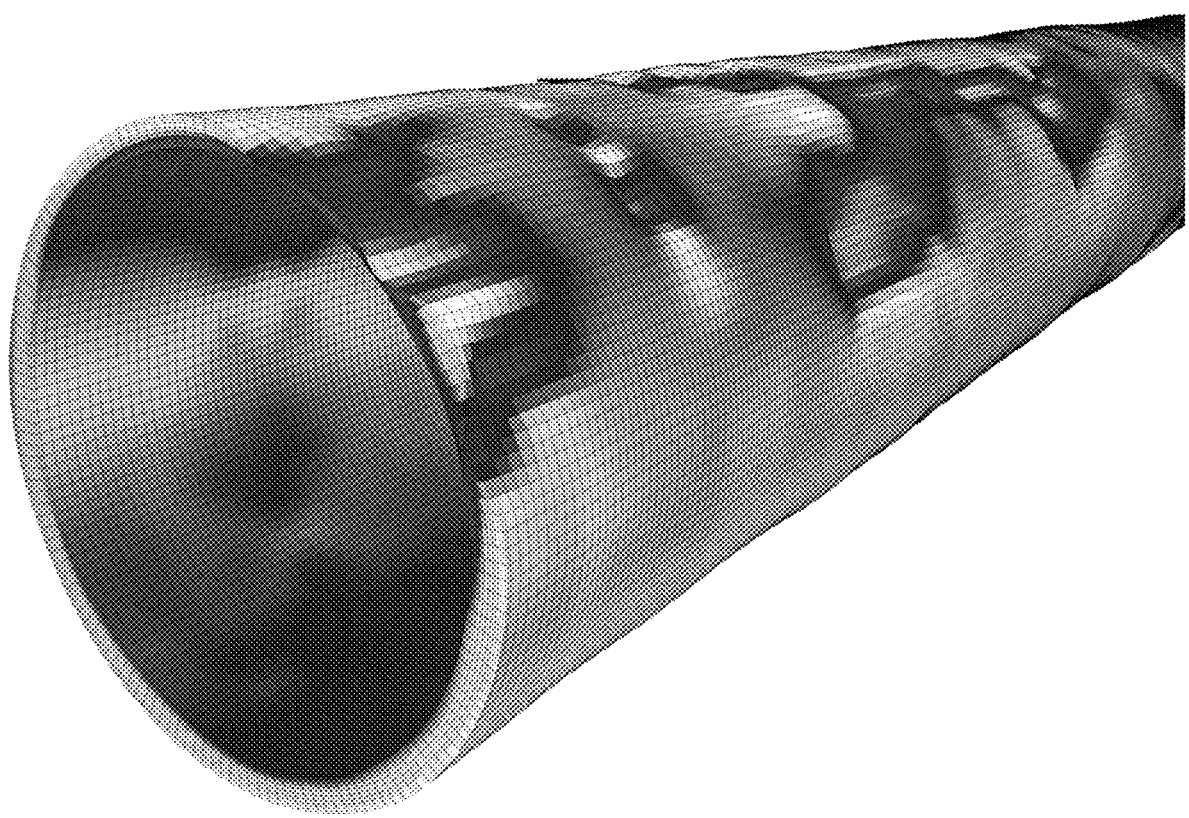
FIG. 8 illustrates a three-dimensional plot of output data.

At S416, simulation results may be presented as one, two and three-dimensional images and analysis tools may be provided for a user to modify different failure criteria to determine loads leading to the onset of failures or any other operational conditions. FIG. 8 illustrates an example of a three-dimensional load image. In some embodiments, the same mesh (or a simplified version thereof) created at S406 is colored with the information of interest such as burst pressure. This provides an accurate and easy to understand representation of the results of the simulation as the contours (e.g., variations in radius or thin wall sections) of the tubular are represented along with the stress distribution in those contours.

In some embodiments, simulated stress results for constant or variable applied pressures (boundary conditions along the surface of the pipe) can be represented as unwrapped sections of a cylinder in a colored two-dimensional image. The scalar quantity of interest (e.g. Von Mises stress) may be used to color the image. The stress images may be static or dynamic. In the case of dynamic stress images, an image attribute such as color may change in response to the user manipulating a parameter of interest. An example of a parameter interest is a value of the applied pressure.

In some embodiments, measurements may be tracked over time and the collective results may be displayed or analyzed. Thus, time-lapsed integrity analysis may be provided. In the case of a dynamic stress image, in some embodiments, the manipulated variable may be time.

Figure 9:
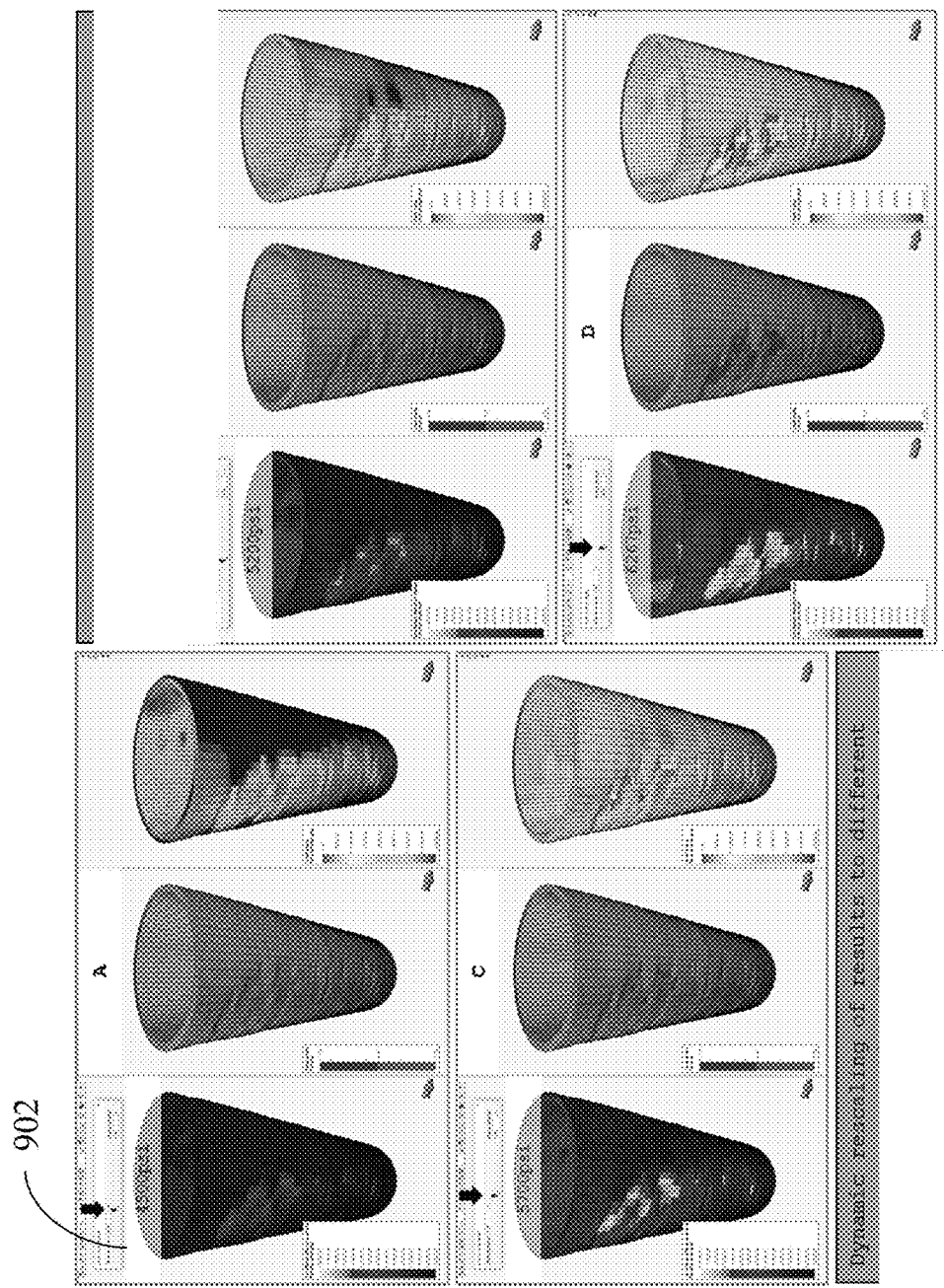
FIG. 9 illustrates a three-dimensional plot of dynamic output data.

An example of a dynamic load image output is illustrated in FIG. 9. Panes A, B, C and D illustrate outputs at different settings of the slider 902. In this example, the first track of each pane represents burst pressure, the second track of each pane represents yield mode, and the third track of each pane represents yield value. Pane A represents output at 4500 psi, Pane B represents output at 5200 psi, Pane C represents output at 5700 psi, and Pane D represents output at 6271. Of course, it will be appreciated that these values and the plots selected to each track is exemplary in nature.

The dynamic features, for example for the variable applied pressure, may include a slider with the output that allows the user to change the assumed pressure inside the pipe. The slider manipulates the elastic stress solution computed for the casing and scales it to visualize and highlight those parts of the casing that will yield and fail first. This scaling adjusts the corresponding Von Mises stress, yield mode and yield value. The Von Mises stress describes the stress inside the casing steel at the assumed internal pressure. The yield mode flags those parts of the casing unstable under the assumed internal pressure, whereas the yield value describes the proximity to yield condition as a continuous variable with zero describing yield condition.

In some embodiments, the computed elastic burst pressure is not changed with this slider as this is the minimum internal pressure in the pipe at which yield conditions are reached for a part in the 3D model. The output displayed may indicate how close the selected pressure is to the burst pressure at a certain location on the mesh grid or whether the selected pressure has exceeded the burst pressure at a location. The elasto-plastic solution obtained for the minimum burst pressure may not be affected by the interactive feature since this will be the pressure causing enough non-elastic deformation and yielding that the casing will be considered to be failing. Thus, the interactive feature can be provided to show the effect of variable pressure changes without recalculating the stress simulation. The stress simulation can be computationally intensive requiring some time to process. The interactive features described herein may be provided in real time, which may not be possible if the simulation had to be rerun to evaluate the effect of applied pressure.

As an example of providing dynamic data without recalculating the stress simulation, the computed stress simulation includes an elastic solution having a linearly scalable pattern. A single analysis is performed with a known pressure—for example 10 MPa—to determine a value of Von Mises stress across the model. The Von Mises stress may be compared to the yield stress. For a dynamic output, if the pressure load is changed, for example doubled, this will double the Von Mises stress, since there may not be other loads to the geomechanical model (or they are negligible or otherwise addressed) and other constraints may remain unchanged. This provides a dynamically viewable Von Mises stress. The yield mode and yield value may be determined from this stress, and the yield stress and the other parameters can also be displayed dynamically as a function of pressure.

The apparatus and methods described above and herein provide important improvements in determining integrity and operational boundaries of subterranean wells. This information may be used to determine whether casing repairs are needed before a failure or environmental event occurs. The information may also be used to set limits on operational pressures thereby improving the production and safety of oilfield activities. Thus, the systems and methods described provide an ordered combination with new results in determining integrity and operational boundaries of wells. In an example, the present application describes a new processing device that determines wellbore stress results in a new form (e.g., the static and dynamic load images described herein), provides new outputs, has higher reliability, uses lower processing resources or provides improved performance. The apparatus and method described cannot be performed manually in any useful sense. Simplified datasets may be used for illustrative purposes but it will be appreciated that the disclosure extends to complex datasets with many constraints thereby necessitating the new hardware-based processing system described herein. The principles disclosed herein may be combined with a computing system to provide an integrated and practical application to improve the determination of integrity and operational boundaries of subterranean wells.

There are several benefits and advantages of the present disclosure. For example, steel casing in wells used for gas storage, production and injection suffer from corrosion and deformation during their life time. The integrity of these wells can be significantly reduced by such damage and geometry changes caused by external factors such as operational conditions, subsidence and faults. Determination of remaining strength of tubulars in service provides advantages to safely operate these assets and to comply with laws, policies and regulations.

Figure 10:
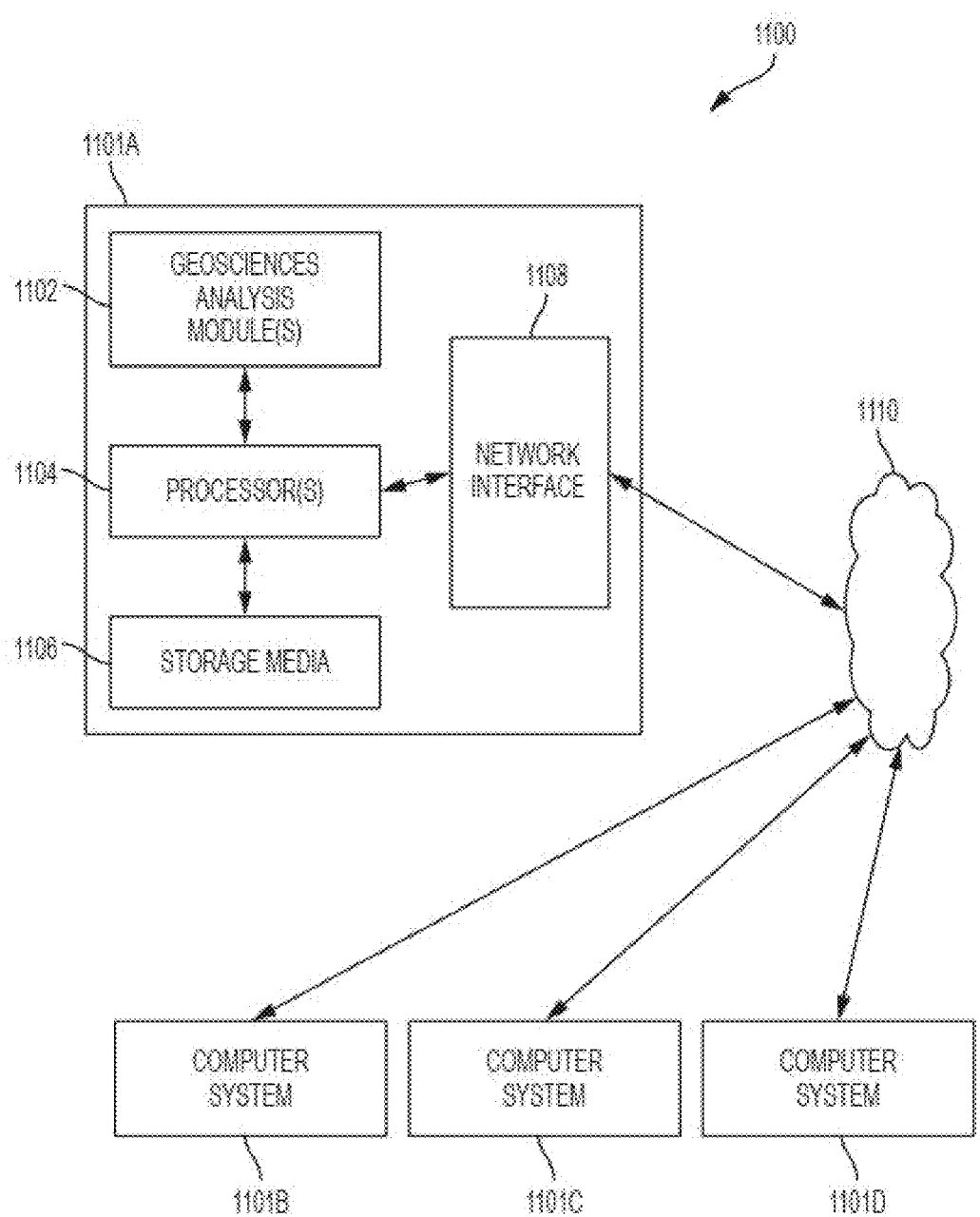
FIG. 10 illustrates a computing system in accordance with an embodiment.

FIG. 10 depicts an example computing system 1100 in accordance with some embodiments. The computing system 1100 can be an individual computer system 1101A or an arrangement of distributed computer systems. The computer system 1101A includes one or more geosciences analysis modules 1102 that are configured to perform various tasks according to some embodiments, such as one or more methods disclosed herein. To perform these various tasks, geosciences analysis module 1102 executes independently, or in coordination with, one or more processors 1104, which is (or are) connected to one or more storage media 1106. The processor(s) 1104 is (or are) also connected to a network interface 1108 to allow the computer system 1101A to communicate over a data network 1110 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be on a ship underway on the ocean, while in communication with one or more computer systems such as 1101C and/or 1101D that are located in one or more data centers on shore, other ships, and/or located in varying countries on different continents). Note that data network 1110 may be a private network, it may use portions of public networks, it may include remote storage and/or applications processing capabilities (e.g., cloud computing).

A processor can include a microprocessor, microcontroller, processor module or subsystem, programmable integrated circuit, programmable gate array, or another control or computing device.

The storage media 1106 can be implemented as one or more computer-readable or machine-readable storage media. Note that while in the example embodiment of FIG. 10 storage media 1106 is depicted as within computer system 1101A, in some embodiments, storage media 1106 may be distributed within and/or across multiple internal and/or external enclosures of computing system 1101A and/or additional computing systems. Storage media 1106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays or any other type of optical media; or other types of storage devices. "Non-transitory" computer readable medium refers to the medium itself (i.e., tangible, not a signal) and not data storage persistency (e.g., RAM vs. ROM).

Note that the instructions discussed above can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computer system 1101A is one example of a computing system, and that computer system 1101A may have more or fewer components than shown, may combine additional components not depicted in the example embodiment of FIG. 10, and/or computer system 1101A may have a different configuration or arrangement of the components depicted in FIG. 10. The various components shown in FIG. 10 may be implemented in hardware, software, or a combination of both, hardware and software, including one or more signal processing and/or application specific integrated circuits.

It should also be appreciated that while no user input/output peripherals are illustrated with respect to computer systems 1101A, 1101B, 1101C, and 1101D, many embodiments of computing system 1100 include computing systems with keyboards, mice, touch screens, displays, etc. Some computing systems in use in computing system 1100 may be desktop workstations, laptops, tablet computers, smartphones, server computers, etc.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the disclosure.

Of course, many processing techniques for collected data, including one or more of the techniques and methods disclosed herein, may also be used successfully with collected data types other than ultrasonic data. While certain implementations have been disclosed in the context of wireline and ultrasonic data collection and processing, those with skill in the art will recognize that one or more of the methods, techniques, and computing systems disclosed herein can be applied in many fields and contexts where data involving structures arrayed in a multi-dimensional space and/or subsurface region of interest may be collected and processed, e.g., medical imaging techniques such as tomography, ultrasound, MM and the like for human tissue; radar, sonar, and LIDAR imaging techniques; mining area surveying and monitoring, oceanographic surveying and monitoring, and other appropriate multi-dimensional imaging problems.

In some embodiments, a computing system is provided that comprises at least one processor, at least one memory, and one or more programs stored in the at least one memory, wherein the programs comprise instructions, which when executed by the at least one processor, are configured to perform any method disclosed herein.

In some embodiments, a computer readable storage medium is provided, which has stored therein one or more programs, the one or more programs comprising instructions, which when executed by a processor, cause the processor to perform any method disclosed herein.

In some embodiments, a computing system is provided that comprises at least one processor, at least one memory, and one or more programs stored in the at least one memory; and means for performing any method disclosed herein.

In some embodiments, an information processing apparatus for use in a computing system is provided, and that includes means for performing any method disclosed herein.

In some embodiments, a graphics processing unit is provided, and that includes means for performing any method disclosed herein.

These systems, methods, processing procedures, techniques, and workflows increase effectiveness and efficiency. Such systems, methods, processing procedures, techniques, and workflows may complement or replace conventional methods for identifying, isolating, transforming, and/or processing various aspects of data that is collected from a subsurface region or other multi-dimensional space to enhance flow simulation prediction accuracy.

A benefit of some of the methods and computing systems of the present disclosure is that more effective and accurate methods for determining integrity and operational boundaries of subterranean wells may be employed. It will be appreciated that the application and benefit of the disclosed techniques are not limited to subterranean wells and may also be applied to production casings, injection casings, gas storage wells, and other types of tubular structures.

While any discussion of or citation to related art in this disclosure may or may not include some prior art references, applicant neither concedes nor acquiesces to the position that any given reference is prior art or analogous prior art.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the invention and its practical applications, to thereby enable others skilled in the art to utilize the invention and various embodiments with various modifications as are suited to the particular use contemplated.

What is claimed is:

1. A method for determining a property of a tubular disposed within a well, comprising:
   obtaining well log data representing measurements performed by a downhole tool at a plurality of depth positions in the well, wherein the well log data represents at least one of inner radius of the tubular, outer radius of the tubular, and wall thickness of the tubular;
   generating a three-dimensional mesh representing the tubular from the well log data, wherein spatial resolution of the well log data that represents at least one of inner radius of the tubular, outer radius of the tubular, and wall thickness of the tubular is used to define resolution of the mesh to capture at least one geometrical feature of the tubular;
   performing a stress simulation which includes simulating stress results for an applied pressure using the three-dimensional mesh to provide an integrity assessment of the tubular; and
   displaying the integrity assessment which includes displaying a representation at stress in the tubular associated with the applied pressure.

2. The method of claim 1, further comprising preprocessing the well log data to remove at least one undesirable artifact in the well log data prior to generating the three-dimensional mesh representing the tubular from the well log data.

3. The method of claim 1, wherein the applied pressure is constant applied pressure.

4. The method of claim 3, wherein the constant applied pressure is applied internally to provide an integrity assessment of burst conditions.

5. The method of claim 3, wherein the constant applied pressure is applied externally to provide an integrity assessment of collapse conditions.

6. The method of claim 3, wherein the constant applied pressure is applied axially to provide an integrity assessment of buckling conditions.

7. The method of claim 1, wherein
   the applied pressure is a variable applied pressure applied internally to provide an integrity assessment of burst conditions, and
   a result of the stress simulation includes stress results associated with a range of the variable applied pressures such that a user may adjust the displayed integrity assessment without recalculating the stress simulation.

8. The method of claim 1, wherein
   the applied pressure is a variable applied pressure applied externally to provide an integrity assessment of collapse conditions, and
   a result of the stress simulation includes stress results associated with a range of the variable applied pressures such that a user may adjust the displayed integrity assessment without recalculating the stress simulation.

9. The method of claim 1, wherein the applied pressure is a variable applied pressure applied axially to provide an integrity assessment of buckling conditions, and a result of the stress simulation includes stress results associated with a range of the variable applied pressures such that a user may adjust the displayed integrity assessment without recalculating the stress simulation.

10. The method of claim 1, wherein the well log data comprises ultrasonic data.

11. The method of claim 1, wherein the tubular is part of a casing of the well.

12. The method of claim 1, wherein the well log data characterizes mechanical properties of environment around the tubular.

13. The method of claim 1, wherein the at least one geometrical feature of the tubular comprises a cavity in the tubular or mechanical property degradation in the tubular.

14. A non-transitory computer readable medium having instructions for causing a processor to perform the method of claim 1.

15. A system, comprising:
   a memory configured to store measurement data including cross-sectional shapes of a tubular at a plurality of depth positions; and
   a processor configured to:
      generate a three-dimensional mesh representing the tubular based on the cross-sectional shapes,
      perform a stress simulation using the three-dimensional mesh to provide an integrity assessment of the tubular; and
      wherein the processor is configured to simulate stress results for a constant applied pressure and cause the display to display a representation of stress in the tubular associated with the constant applied pressure, and the constant applied pressures includes at least one of: an internal pressure to provide an integrity assessment of burst conditions, an external pressure to provide an integrity assessment of collapse conditions, and an axial pressure to provide an integrity assessment of buckling conditions.

16. The system of claim 15, wherein the stress simulation is based at least in part on mechanical properties of environment around the tubular.

17. The system of claim 15, wherein the measurement data includes ultrasound data and at least one of inner radius information, outer radius information, and wall thickness information.

18. The system of claim 15, further comprising a user input device configured to receive an adjustment of a pressure value, wherein the processor is configured to cause the displayed integrity assessment in response to the adjustment of the pressure value without re-performing the stress simulation.

19. A system for determining a property of a tubular disposed within a well, comprising:
   a memory configured to store well log data representing measurements performed by a downhole tool at a plurality of depth positions in the well, wherein the well log data represents at least one of inner radius of the tubular, outer radius of the tubular, and wall thickness of the tubular; and
   a processor configured to:
   generate a three-dimensional mesh representing the tubular from the well log data, wherein spatial resolution of the well log data that represents at least one of inner radius of the tubular, outer radius of the tubular, and wall thickness of the tubular is used to define resolution of the mesh to capture at least one geometrical feature of the tubular;
   perform a stress simulation which includes simulating stress results for an applied pressure using the three-dimensional mesh to provide an integrity assessment of the tubular; and
   display the integrity assessment which includes displaying a representation of stress in the tubular associated with the applied pressure.

20. The system of claim 19, wherein the well log data comprises ultrasonic data.

\* \* \* \* \*